United States Patent
Levin et al.

(10) Patent No.: US 10,907,524 B2
(45) Date of Patent: Feb. 2, 2021

(54) HELICAL DIESEL EXHAUST FLUID MIXER

(71) Applicant: Ford Global Technologies, LLC, Dearborn, MI (US)

(72) Inventors: Michael Levin, Ann Arbor, MI (US); Furqan Shaikh, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/381,670

(22) Filed: Apr. 11, 2019

(65) Prior Publication Data
US 2020/0325811 A1    Oct. 15, 2020

(51) Int. Cl.
*F01N 13/08* (2010.01)
*F01N 3/20* (2006.01)

(52) U.S. Cl.
CPC ............ *F01N 13/08* (2013.01); *F01N 3/206* (2013.01); *F01N 2610/02* (2013.01); *F01N 2610/1453* (2013.01)

(58) Field of Classification Search
CPC .. F01N 13/08; F01N 3/206; F01N 2610/1453; F01N 2610/02
See application file for complete search history.

(56) References Cited

U.S. PATENT DOCUMENTS

2002/0162322 A1* 11/2002 Ganzmann ............ F01N 3/2066
60/286
2009/0019843 A1* 1/2009 Levin .................... B01F 5/0614
60/303
2012/0216513 A1* 8/2012 Greber ................ F01N 13/0097
60/295
2016/0348557 A1 12/2016 Dalimonte et al.
2019/0022583 A1* 1/2019 Denton ................. B01F 5/0473

FOREIGN PATENT DOCUMENTS

CN          107257709 A     10/2017

OTHER PUBLICATIONS

"Eberspaecher starts series production of tunnel mixers," Eberspaecher Website, Available Online at https://www.eberspaecher.com/en/nc/press/press-releases/individual-view/article/eberspaecher-starts-series-production-of-tunnel-mixers.html, 4 pages.

* cited by examiner

*Primary Examiner* — Brandon D Lee
(74) *Attorney, Agent, or Firm* — Geoffrey Brumbaugh; McCoy Russell LLP (57) ABSTRACT

Methods and systems are provided for an exhaust gas aftertreatment mixing assembly. In one example, the mixing assembly includes an injector and a helical blade. The injector may be positioned relative to the helical blade with an orientation that augments entrainment and dispersion of a diesel exhaust fluid into an exhaust gas stream and the helical blade may be configured to increase an exhaust gas flow path while maintaining a compact size of the mixing assembly. Geometries of the injector and the helical blade together may increase decomposition of a diesel exhaust fluid to facilitate enhanced reduction of nitrous oxides in exhaust gases.

18 Claims, 5 Drawing Sheets

FIG. 5

HELICAL DIESEL EXHAUST FLUID MIXER

FIELD

The present description relates generally to exhaust gas aftertreatment.

BACKGROUND/SUMMARY

Diesel engines may include a selective catalytic reduction (SCR) system in an emission control device to reduce discharge of nitrogen oxides ($NO_x$) during engine operation. A reductant, such as diesel exhaust fluid (DEF), may be injected directly into an exhaust passage upstream of the SCR system through a specialized DEF injector in a DEF dosing apparatus. In one example, the DEF is an aqueous urea solution. The injected urea solution mixes with exhaust gas and breaks down to provide ammonia ($NH_3$) in the exhaust stream. The ammonia then reacts with $NO_x$ in the exhaust at a catalyst to produce nitrogen gas ($N_2$) and water ($H_2O$).

Reduction of $NO_x$ can be further assisted by exhaust gas recirculation (EGR). During EGR, a portion of exhaust gas produced at the engine's combustion chambers may be returned to the combustion chambers, diluting oxygen in the incoming air stream with gases inert to combustion. The inert gases absorb combustion heat, thereby lowering peak in-cylinder temperatures and decreasing generation of $NO_x$. However, implementation of EGR during high torque output events may degrade engine performance, therefore EGR may be halted when engine loads are high. During such occasions, treatment of $NO_x$ may rely entirely on the SCR system and an efficiency of the SCR system may be dependent upon an effectiveness of urea dosing upstream of the SCR system.

The urea of the DEF is susceptible to dehydration and crystallization. Hot exhaust gases may heat the DEF, causing water to evaporate and leave behind solid urea in the form of urea deposits. The deposits may be removed by heat treatment at high temperatures but the removal process is confounded by degradation of the $NO_x$ reduction reaction at such temperatures. Furthermore, heavy usage of the SCR system may lead to an increased frequency in deposit removal events which may adversely affect a fuel economy of the engine.

In addition, lengthening a mixing path of DEF droplets with hot exhaust gases may increase a uniform dispersion of atomized DEF into the gases, thereby enhancing evaporation of the DEF prior to interaction with the SCR catalyst. A longer mixing path may also provide a more heterogeneous mixture of exhaust gas and DEF at the SCR catalyst. However, tight packaging space in compact vehicles may inhibit augmentation of the flow path along an axial direction.

Attempts to address removal of urea deposits without decreasing $NO_x$ conversion or vehicle fuel efficiency include implementing devices to increase mixing of urea into an exhaust gas stream. One example approach is shown in Chinese Patent No. 107257709. Therein, an exhaust aftertreatment system includes a first mixer with a plurality of auger blades and a second mixer, configured with a single auger blade, positioned downstream of the first mixer. Both the first mixer and the second mixer are arranged downstream of a DEF injector and in a path of exhaust gas flow. The first mixing device may create a plurality of flow paths for that are recombined into a single path at the second mixer. A central axis of the first mixer is not aligned with a central axis of the second mixer, the misalignment resulting in an increased radial distance through which DEF particles travel between the first and second mixers without increasing an axial distance between the mixers. The increased radial distance prolongs a residence time of the atomized DEF fluid in the exhaust gases, thereby increasing evaporation of the reducing agent and conversion of urea to ammonia.

However, the inventors herein have recognized potential issues with such systems. As one example, implementing an exhaust aftertreatment system with more than one mixer that splits the gas stream into more than one flow path increases surface areas on which urea droplets may impinge, inhibiting further transport of the urea to a downstream SCR catalyst. Furthermore, during warm-up periods, light engine loads or near idle conditions, low exhaust gas flow rates through an exhaust passage may not sufficiently propel the urea through both the first and second mixers, particularly if there is a temperature gradient between the mixers, with the second mixers cooler than the first mixer, resulting in condensation of urea droplets at the second mixer.

In one example, the issues described above may be addressed by an exhaust mixing assembly including a spiraling blade extending from an upstream fin to a downstream fin relative to a direction of incoming exhaust flow, wherein outer edges of the spiraling blade and the upstream and downstream fins are in face-sharing contact with an exhaust pipe shaping an exhaust passage, and wherein an entire exhaust flow is forced to flow partially circularly along the spiraling blade before reaching a catalyst downstream of the exhaust mixer. In this way, an airborne time of DEF droplets may be prolonged, reducing formation of deposits on surfaces upstream of an SCR catalyst.

As one example, the mixer may include a single, compact helical blade that increases a flow path of exhaust gas and suspended DEF droplets between an injector and the SCR catalyst by imparting the flow with an amount of rotation imposed by a combination of injector angle, positioning of mixer inlet relative to the injector, angular sweep of the helical blade, and direction of spray at the injector relative to gas flow. Evaporation of the DEF is increased, thereby increasing an amount of DEF reaching the SCR catalyst.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-6 are shown approximately to scale

DETAILED DESCRIPTION

Figure 1:
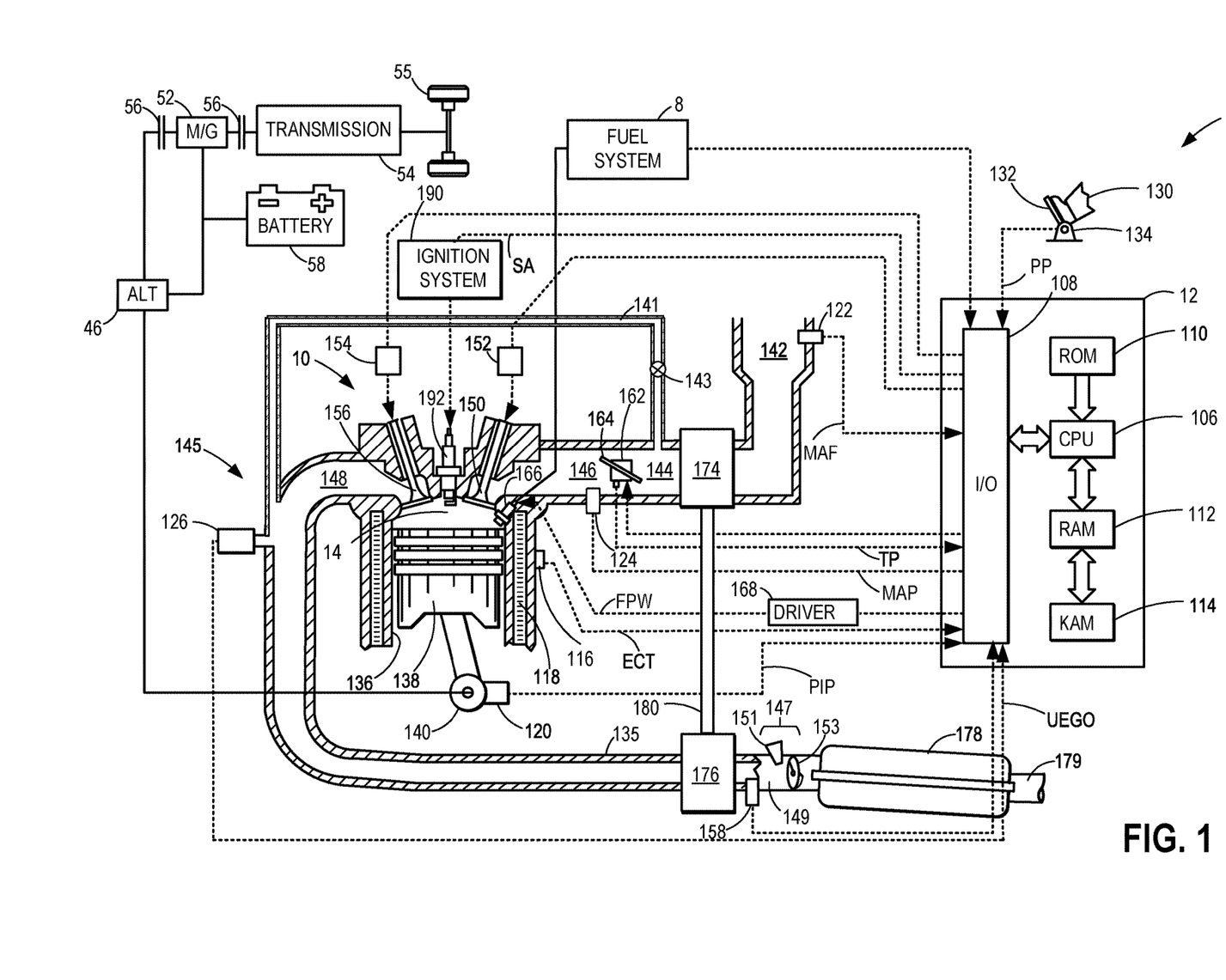
FIG. 1 shows an example of an engine system, including an exhaust gas aftertreatment system in which an SCR catalyst and a diesel exhaust fluid (DEF) mixing assembly may be implemented.

The following description relates to systems and methods for a DEF mixing assembly for an exhaust gas aftertreatment system. The DEF mixing assembly may be installed in an exhaust system of an engine system. An example of the engine system is depicted in FIG. 1 as a schematic diagram. The DEF mixing assembly may include an injector and a mixer, configured as a helical blade, as shown in FIGS. 2-6 from various views. The injector may be tilted at an angle that sprays DEF fluid into a path of exhaust flow in a direction opposing gas flow and the helical blade may be configured to sweep through an angle that increases a flow path of the DEF fluid and exhaust gas, between an inlet of the helical blade and an SCR catalyst arranged downstream of the DEF mixing assembly, by rotating the flow. The increased flow path allows the DEF fluid to evaporate and mix with the exhaust gas more completely, thereby increasing a dosage of DEF fluid at the SCR catalyst. As a result, the SCR catalyst may remove nitrous oxides from exhaust gases more efficiently prior to releasing the gases to the atmosphere.

FIGS. 2-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to the figures, FIG. 1 depicts an example of a cylinder 14 of an internal combustion engine 10, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

An exhaust system 145 is coupled to cylinder 14 via a poppet valve 156. The exhaust system includes an exhaust manifold 148, an emission control device 178, and exhaust tail pipe 179. Exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a $NO_x$, a HC, or a CO sensor, for example. In the example of FIG. 1, exhaust gas sensor 126 is a UEGO. Emission control device 178 may be a three-way catalyst, a $NO_x$ trap, various other emission control devices, or combinations thereof. In the example of FIG. 1, emission control device 178 is a selective catalytic reduction (SCR) catalyst configured to convert $NO_x$ to nitrogen gas and water.

Engine 10 may further include one or more exhaust gas recirculation passages for recirculating a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and $NO_x$ emissions. In the depicted embodiment, exhaust gas may be recirculated from exhaust manifold 148 to intake passage 144 via EGR passage 141. The amount of EGR provided to intake passage 148 may be varied by controller 12 via EGR valve 143. In other examples, engine 10 may be configured to also provide low pressure EGR (not shown in FIG. 1) being provided via an LP-EGR passage coupled between the engine intake upstream of the turbocharger compressor and the engine exhaust downstream of the turbine.

A mixing assembly 147 may be arranged downstream of turbine 176 and upstream of emission control device 178 in an exhaust passage 149. The mixing assembly includes an injector configured to introduce a diesel exhaust fluid (DEF) into the exhaust passage 149 as exhaust gas flows therethrough. In one example, the DEF may be an aqueous solution of urea. The injected DEF is carried along the gas stream through a mixer, configured as a helical blade 153, arranged downstream of the injector 151. The helical blade 153 may force the exhaust gas to flow through a spiraling path, extending a distance that the injected DEF travels before reaching emission control device 178 without increasing a length of the exhaust passage 149. Detail and effects of the mixing assembly 147 are described further below with reference to FIGS. 2-7.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternate example, fuel injector 166 may be arranged in an intake passage rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and further configured to inject this fuel mixture directly into cylinder. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, or the first and second fuels may differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a profile ignition pickup signal (PIP) from a Hall effect sensor 120 (or other type) coupled to crankshaft 140; throttle position (TP) from a throttle position sensor; signal UEGO from exhaust gas sensor 126, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1 and employs the various actuators of FIG. 1 to adjust engine operation based on the received signals and instructions stored on a memory of the controller. For example, the controller may estimate the AFR of the exhaust gas based on a signal from the exhaust gas sensor 126 and used the inferred AFR to adjust a fuel injection rate at the cylinder 14.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

An exhaust system of a vehicle may channel exhaust gases from combustion chambers of the vehicle's engine, to an aftertreatment system including a SCR catalyst housed in an emission control device, such as the emission control device 178 of FIG. 1. The SCR catalyst provides reaction sites for chemical conversion of $NO_x$, present in exhaust gases as combustion byproducts, to nitrogen gas ($N_2$) and water before the gases are released to the atmosphere. Catalytic conversion of $NO_x$ to $N_2$ and water relies on adsorption of ammonia at the reaction sites of the SCR catalyst to effect reduction of $NO_x$. During low engine loads and speeds when EGR is low or inactive, the engine may rely heavily upon efficient conversion of the DEF to ammonia to enable complete reduction of $NO_x$.

Urea may be used as a DEF due to its decomposition to ammonia and $CO_2$ in solution. For each molecule of urea, two molecules of ammonia may be generated upon dissolution. Urea may be dissolved in water and sprayed directly into an exhaust gas stream flowing to the SCR catalyst, the urea mixing and evaporating in the hot exhaust gases and forming ammonia. The urea may be delivered to the gas stream through a mixing device that modifies a gas flow path between a DEF injector and the SCR catalyst and increases dispersion of the urea solution amongst the exhaust gases. Complete decomposition to ammonia may depend on droplet formation of the urea solution when injected into the gas stream, an amount of time allowed for evaporation, and an amount of available heat.

An amount of heat supplied to the exhaust gases is determined by engine operating conditions and engine calibration to provide a desirable fuel consumption of the engine. Thus available heat may not be readily adjusted to accommodate SCR efficiency. In particular, during low engine speeds, engine temperature may drop to a low temperature boundary for efficient conversion of urea to ammonia, such as 180° C. Engine temperature approaching or decreasing to this boundary may provide insufficient thermal energy to facilitate complete decomposition. To compensate for low engine temperature, droplet formation may be adjusted based on a configuration of an injector introducing the DEF to the exhaust gas stream. For example, an injector capable of spraying the DEF as a fine mist, e.g., atomization, may increase evaporation and homogeneity of urea dispersed into the exhaust gases.

However, regardless of drop size, impingement of urea droplets onto surface areas of the mixing device may lead to formation of urea deposits. When exhaust gas temperatures heat the mixing device surfaces to or approaching a boiling point of water, the aqueous solution may rapidly evaporate upon contact or coming within close proximity to the heated surfaces. Evaporation of water from the aqueous solution may result in deposition of urea crystals, reducing a dosage of urea that provides ammonia at the SCR catalyst.

Reducing an area of surfaces upon which the urea solution may impinge may reduce the issue of urea deposition and crystallization but benefits derived via surface area reduction may be offset by a consequential decrease in evaporation time, e.g., by shortening a flow path and residence time of the dispersed urea droplets in the exhaust gases. The decreased evaporation time may lead to incomplete decomposition of urea and degraded efficiency of the SCR catalyst towards converting $NO_x$. Furthermore, prolonging the evaporation time by lengthening an exhaust passage, such as the exhaust passage 149 of FIG. 1, may not be feasible in a vehicle with restricted packaging space.

In some examples, the flow path may be increased by guiding gas flow through a radial, spiraling path. An example of a mixing assembly is shown in FIGS. 2-7, configured with a helical blade that compels the urea droplets and the exhaust gases to follow a winding route. A DEF injector is arranged adjacent to an inlet of a mixer of the mixing assembly. The helical blade may sweep through a target angle that is greater than 360 degrees to maximize an exhaust gas flow path through a confined region of an exhaust passage. An orientation of the injector, relative to a direction of rotating exhaust gas flow and to an inlet and outlet of the helical blade may regulate mixing of the urea solution with exhaust gases, thus affecting evaporation and conversion of urea to ammonia. In addition, a geometry of the helical blade, including a sweep of angles and incorporation of flat sections, may further enhance efficiency of $NO_x$ reduction. Details of the mixing assembly are described further below with reference to FIGS. 2-7.

Figure 2:
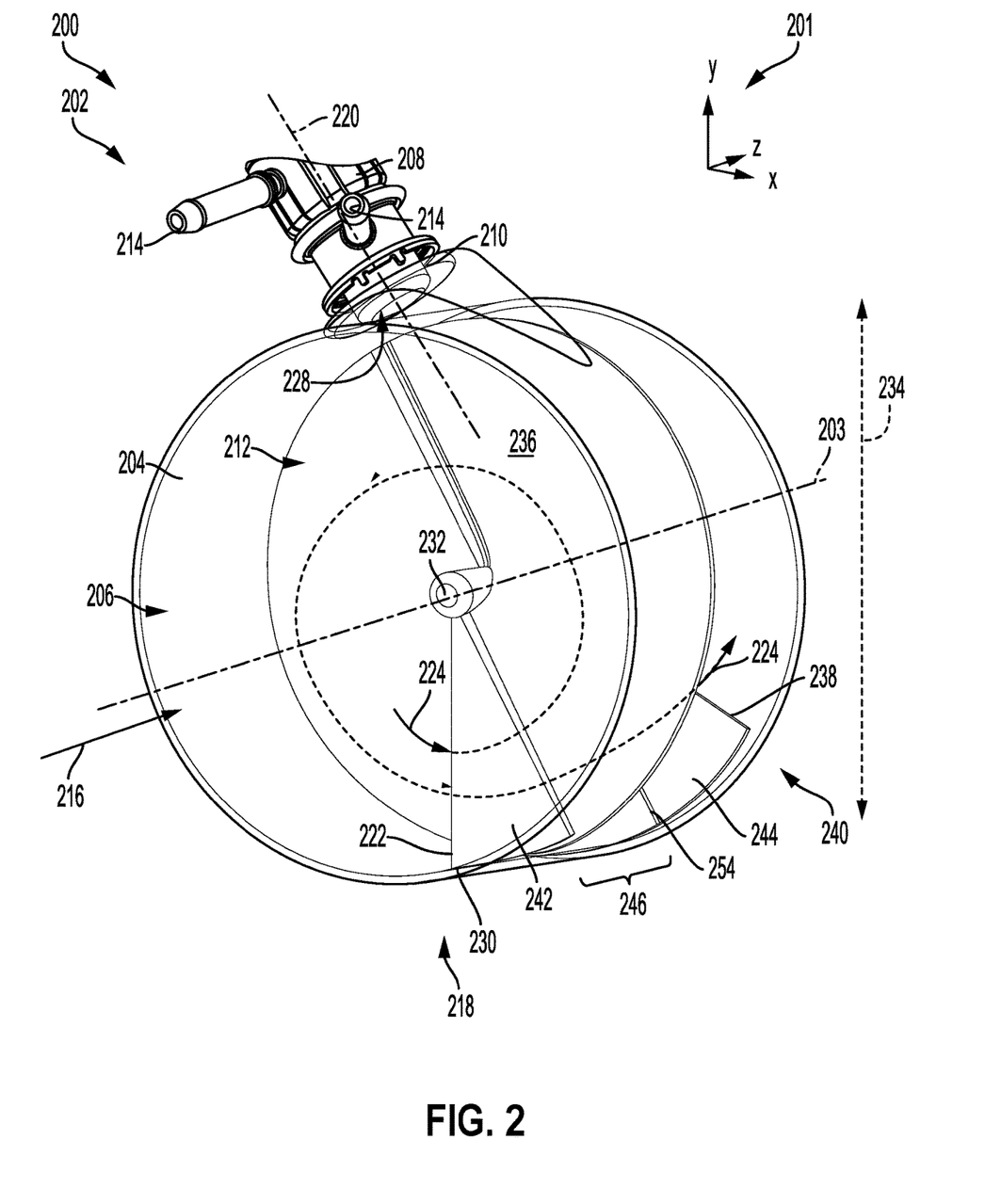
FIG. 2 shows an example of a DEF mixing assembly from a first perspective view.
Figure 3:
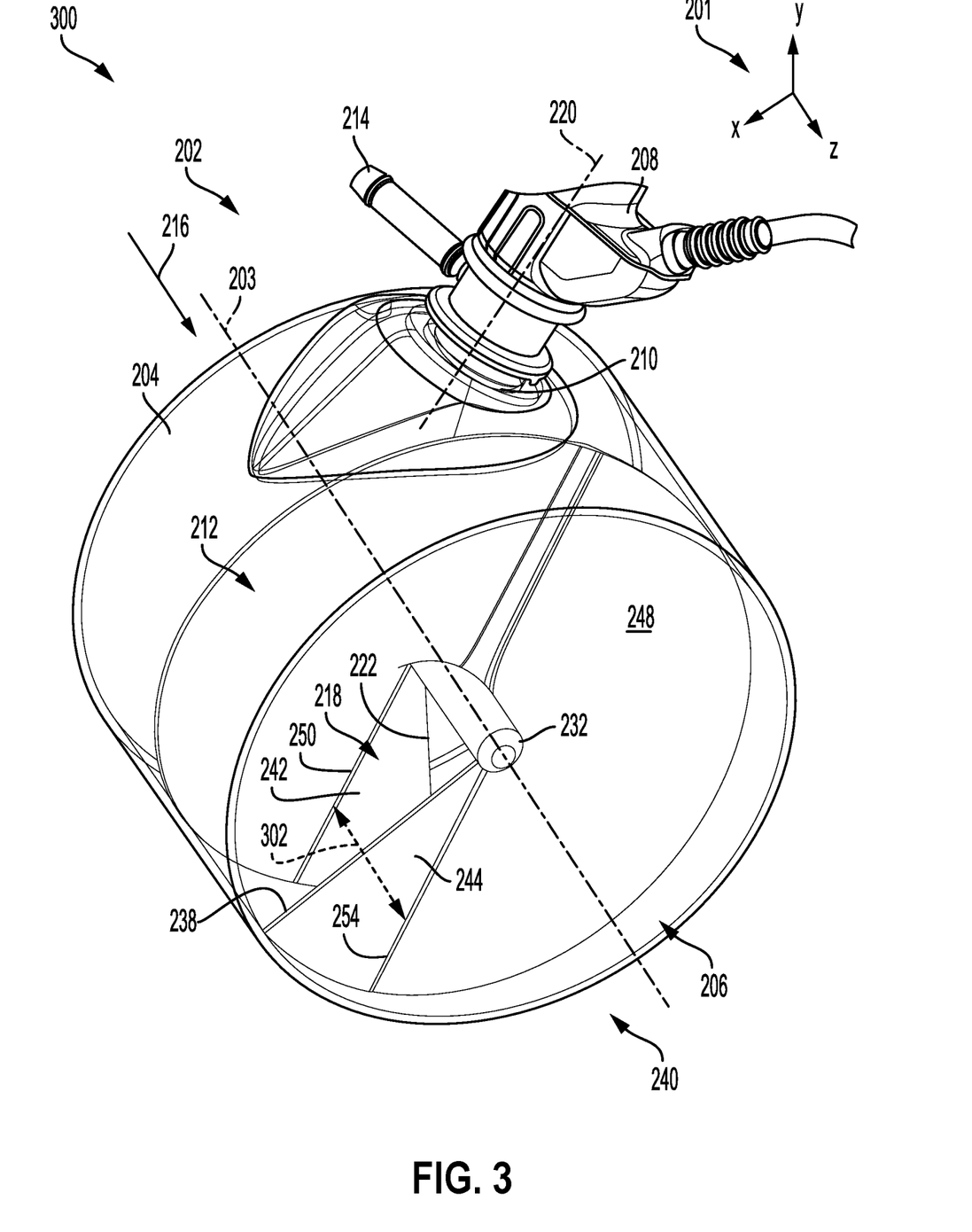
FIG. 3 shows the DEF mixing assembly from a second perspective view.
Figure 4:
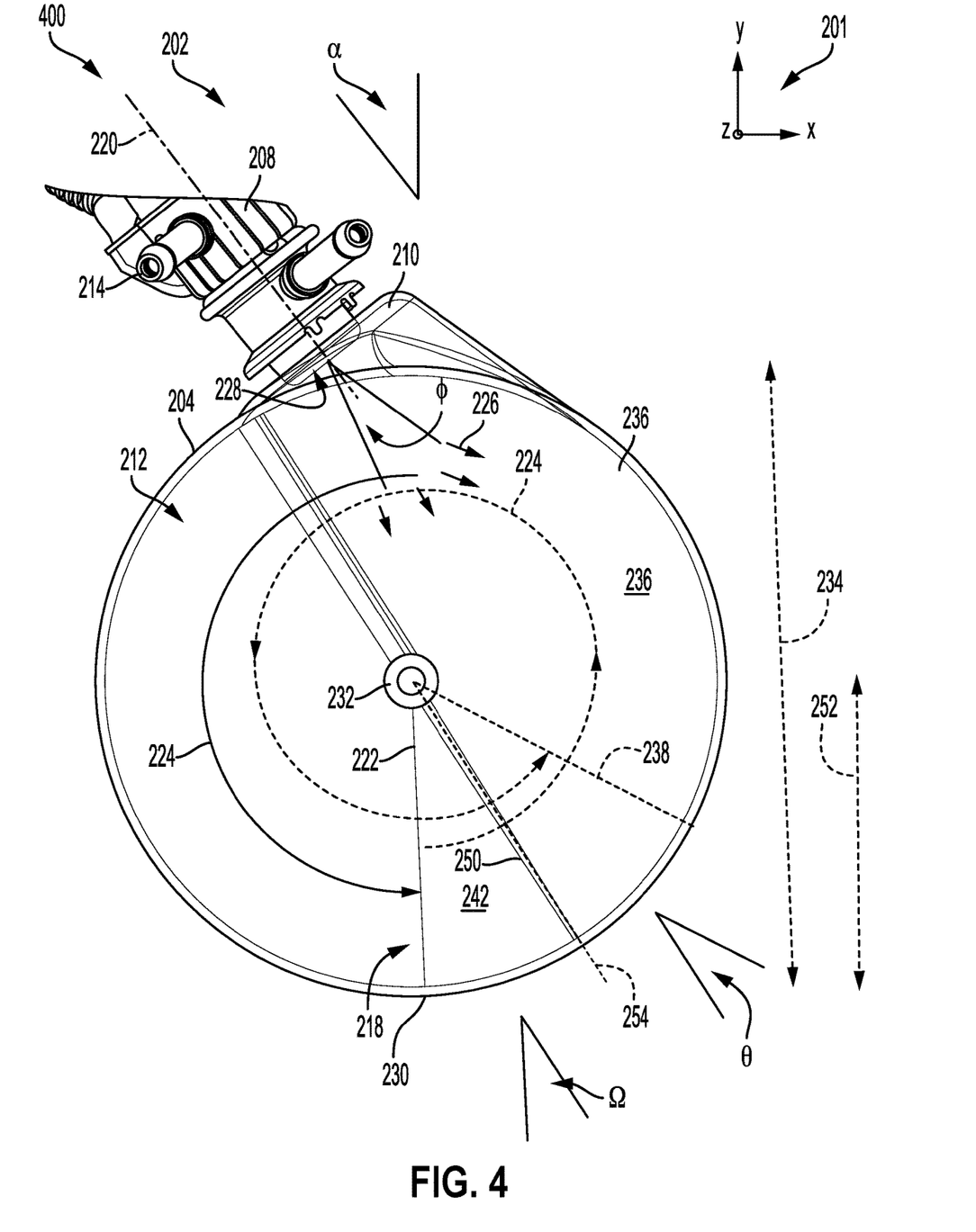
FIG. 4 shows the DEF mixing assembly from a front view.
Figure 5:
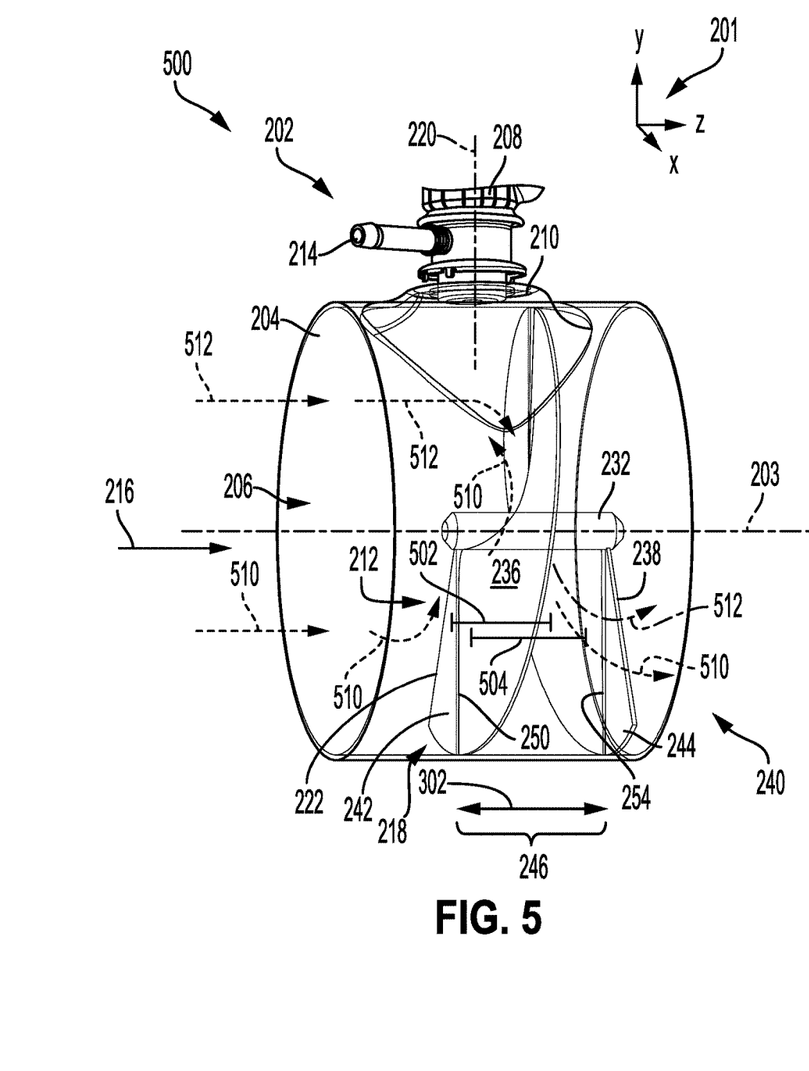
FIG. 5 shows the DEF mixing assembly from a third perspective view.
Figure 6:
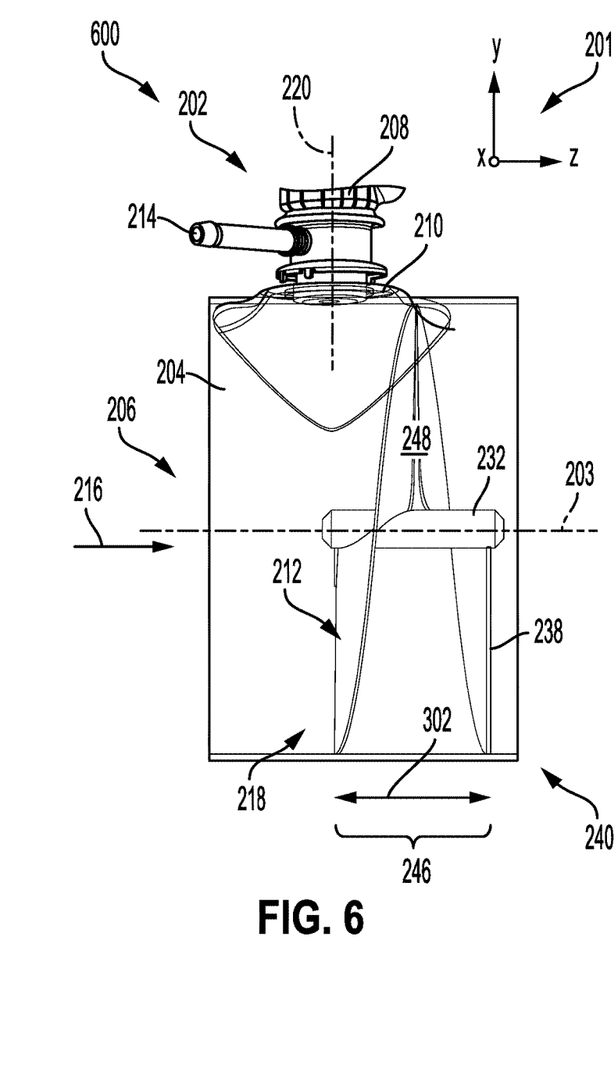
FIG. 6 show the DEF mixing assembly from a profile view.

A mixing assembly 202 is shown in FIGS. 2-6 from a first, second, and third perspective view in FIGS. 2, 3, and 5, respectively, from a front view in FIG. 4, and a profile view in FIG. 6. FIGS. 2-6 will be described collectively and are similarly numbered. In one example, the mixing assembly 202 may be the mixing assembly 147 shown in FIG. 1, positioned downstream of an exhaust manifold and exhaust turbine and upstream of an emission control device. A set of reference axes 201 are provided for comparison between views shown, indicating a y-axis, an x-axis, and z-axis.

The mixing assembly 202 may be coupled to an exhaust passage 204, which may be a cylindrical shell with an inner volume 206 configured to flow exhaust gas from the exhaust manifold to the emission control device. The exhaust passage 204 has a central axis 203, parallel with the z-axis. The mixing assembly 202 includes an injector 208, inserted through an opening 210 in a wall of the exhaust passage 204 and a helical blade 212 positioned within the inner volume 206 of the exhaust passage 204. The helical blade 212 may be circumferentially surrounded by a wall of the exhaust passage 204. The injector 208 and the helical blade 212 may be two separate components of the mixing assembly 202.

The injector 208 may include a plurality of nozzles 214 protruding outwards from a surface of the injector 208 to fluidly couple the injector 208 to various solution reservoirs, such as an aqueous urea solution reservoir. The injector 208 may be used to introduce a DEF, such as the aqueous urea solution, into the exhaust passage 204 to mix with exhaust gas flowing therethrough, as indicated by arrow 216. An inner region of the injector 208 may include a vaporizing element that sprays the DEF into the exhaust passage 204, upstream of an upstream end 218 of the helical blade 212, as tiny droplets. As an example, the vaporizing element may form droplets between 30-100 μm in diameter. In some examples, an ultrasonic vaporizer may be implemented to produce droplets smaller than 30 and in some instances, smaller than 10 As such, the vaporizing element is positioned to inject and/or spray the DEF directly into the inner volume 206 of the exhaust passage 204 in a radial direction angled to (e.g., perpendicular to) a direction of exhaust gas flow (arrow 216).

The injector 208 may be tilted with respect to the y-z plane, as shown in FIG. 4. While an axis 220 of the injector 208 may be parallel with the y-x plane, as shown in FIGS. 5 and 6, the injector axis 220 is not parallel with the y-z plane nor perpendicular to the x-z plane, as shown in FIG. 2. The front view 400 of FIG. 4 illustrates an angle α formed between the injector axis 220 and the y-axis equal to, for example, 24 degrees or between 19-29 degrees. As a leading edge 222 of the upstream end 218 of the helical blade 212 is parallel with the y-axis along the y-x plane, the injector 208 may also be tilted with respect to the leading edge 222 by the angle α (along the y-x plane). In addition the DEF spray emerging from the injector 208 and directed into the inner volume 206 of the exhaust passage 204 may have a cone angle of 30 degrees, as one example.

The injector 208 may be positioned directly above and upstream of the leading edge 222 of the upstream end 218 of the helical blade 212 with respect to the y-axis and along the y-z plane, as shown in FIGS. 5 and 6. Furthermore, the injector 208 protrudes through the wall of the exhaust passage 204 at a first point 228 that is substantially, but not exactly, opposite of a second point 230 along a circumference of the exhaust passage 204 where the leading edge 222 of the helical blade 212 intersects with the wall of the exhaust passage 204, the first point 228 and the second point 230 shown in FIGS. 2 and 4. As the leading edge 222 extends from a central hub 232 of the helical blade 212 to the second point 230, the leading edge 222 extends across half of an outer diameter 234 of the helical blade 212, which may be similar to a diameter of the inner volume 206 of the exhaust passage 204. An outer edge of the helical blade 212 may be in contact with an inner surface of the wall of the exhaust passage 204. The leading edge 222 of the helical blade 212 may be spaced away from the injector 208 at the first point 228 by a distance equal to half of the outer diameter 234 of the helical blade 212.

By positioning the injector 208 above, with respect to the y-axis, the leading edge 222 of the helical blade 212, as shown in FIG. 6, deposition and loss of DEF droplets onto an inner surface of the exhaust passage 204 upstream of the helical blade 212 is minimized. Arranging the injector 208 substantially opposite to the leading edge 222 of the helical blade 212, e.g., spaced away from the leading edge 222 by half of the outer diameter 234 of the helical blade, in conjunction with overhead placement of the injector 208 allows maximum entrainment of the DEF droplets into the exhaust gas stream flowing through the exhaust passage 204. For example, rotating the helical blade 212 so that the leading edge 222 intersects with the first point 228 along the circumference of the wall of the exhaust passage 204 may result in at least a portion of the DEF droplets being sprayed beyond a length of the leading edge 222 (e.g., half of the outer diameter 234 of the helical blade 212), past the central hub 232 and impinging on a front facing surface 236 of the helical blade 212.

Furthermore, as gases enter the helical blade 212, the gases may be swirled in a counterclockwise direction, as indicated by arrows 224 when viewed from the first perspective view 200 in FIG. 2 and the front view 400 in FIG. 4. As the DEF droplets are ejected from the injector 208 and entrained into the flow of gases, the DEF and gas mixture rotate through 180 degrees between a point where the DEF droplets interact with the gas flow and the leading edge 222 of the helical blade 212. A rotational effect of the helical blade 212 on exhaust gas flow will be described further below. Due to the tilting of the injector 208 along the angle α, the DEF may be sprayed into the exhaust passage in an opposite direction from the swirling of the gases, e.g., in a clockwise direction, as shown in FIG. 2 by arrows 224. The opposing spray direction of the DEF droplets compared to the swirling of the exhaust gases generates high turbulence that increases dispersion of the DEF droplets into the gas stream and promotes more uniform distribution of the droplets throughout the gas stream. The cone angle ϕ may be tuned according to the gas flow velocity and exhaust passage diameter to provide maximum capture of the DEF droplets by the flow of gases. Thus optimizing the tilt angle α of the injector 208, the cone angle Φ, and the orientation of the injector 208 relative to the leading edge 222 of the helical blade 212 may together enable enhanced delivery of the DEF to the gas stream, reducing losses due to impingement of DEF droplets upstream of the helical blade 212.

While the position of the injector 208 may be tuned to deliver a dosage of DEF to the upstream end 218 of the helical blade 212 to minimize losses due to impingement, the helical blade 212 may also be configured with a set of geometric attributes to maximize the DEF dosage to the SCR catalyst. The helical blade 212 may resemble a blade of an auger, formed from a continuous, spiral wall rotating about the central hub 232. A flow passage length may begin at the leading edge 222 of the helical blade 212 and end at a terminal edge 238, the terminal edge at a downstream end 240, the downstream end 240 opposite of the upstream end 218 of the helical blade 212. The terminal edge 238 is shown in FIGS. 2, 3, and 5-6, and a shape of the spiral flow passage through the helical blade 212 indicated by arrows 224 in FIG. 2. The helical blade 212 may rotate gas at least 180 degrees and, in some examples, greater than 360 degrees.

For example, exhaust gases flowing through the exhaust passage 204 may arrive at the upstream end 218 at different regions along the front facing surface 236 of the helical blade 212. In one example, as shown in FIG. 5 by arrows 510, a first portion of the gas stream may contact the helical blade 212 in an area below, with respect to the y-axis, the central axis 203, along the leading edge 222. Friction between the first portion of the gas stream and the front facing surface 236 of the helical blade 212 may drive spiraling of the first portion through the flow passage of the helical blade 212 from the leading edge 222 to the terminal edge 238, rotating through 420 degrees. In contrast, a second portion of the gas stream may enter the helical blade 212 at a region above the central axis 203, at a contact point downstream of the leading edge 222 at the front facing surface 236 of the helical blade 212. The second portion may bypass a portion of the helical blade 212 between the leading edge 222 and the point of contact between the second portion and the front facing surface 236. As such, the second portion of the gas stream may be rotated less than the first portion, e.g., through 240 degrees, as an example. A minimum amount of rotation induced by the helical blade 212 may therefore be 180 degrees.

As the DEF is sprayed into the exhaust passage 204, the positioning of the injector 208 opposite of the leading edge 222 of the helical blade 212 relative to the central axis 203 results in the DEF droplets coming into contact with the second portion of the gas stream before the first portion. Thus the DEF droplets may be entrained into the second portion of the gas stream, behind the first flat segment 242 relative to the direction of gas flow (arrow 216), flowing along a flow passage that swirls the DEF droplets through less than 360 degrees. Impingement of the DEF droplets along the front facing surface 236 of the helical blade 212, at the first flat segment 242, as well as along the inner surface of the exhaust passage 204, is thus circumvented.

The helical blade 212 includes a first flat segment 242, arranged at the upstream end 218, and a second flat segment 244, arranged at the downstream end 240. A central portion 246 of the helical blade 212, shown in FIGS. 2, 5, and 6, extends between the first flat segment 242 and the second flat segment 244. The first and second flat segments 242, 244 may be fins coupled to extreme ends of the central portion 246. The central portion 246 forms a largest portion of the helical blade 212 and spirals along the z-axis so that the front facing surface 236, and a rear facing surface 248 that is opposite of the front facing surface 236, are not co-planar with the x-y plane at any point along the central portion 246 of the helical blade 212. In other words, the central portion 246 winds around the central hub 232 at an angle relative to each of the x-, y-, and z-axes. In contrast, both of the first flat segment 242 and the second flat segment 244 are co-planar with the x-y plane. The first flat segment 242 may extend between the leading edge 222 and a first inner edge 250 of the helical blade 212, forming a wedge-shaped panel, e.g., triangular with one rounded edge. The first flat segment 242 may intersect with the central portion 246 of the helical blade 212 along the first inner edge 250 with both the leading edge 222 and the first inner edge 250 extending along a radius 252 (as shown in FIG. 4) of the exhaust passage 204. The second flat segment 244, depicted in FIG. 3, may be similarly configured as the first flat segment 242, forming a wedge-shaped panel between the terminal edge 238 and a second inner edge 254 of the helical blade 212. The second flat segment 244 may intersect with the central portion 246 of the helical blade 212 along the second inner edge 254 and both the second inner edge 254 and the terminal edge 238 may extend along the radius 252 of the exhaust passage 204.

The first flat segment 242 and the second flat segment 244 are both co-planar with the x-y plane, and thus are co-planar with one another. In this way, the first flat segment 242 and the second flat segment 244 are exactly perpendicular to the direction of exhaust gas flow and the z-axis. As such, the first flat segment 242 and the second flat segment 244 do not extend in an upstream direction opposite the direction or exhaust gas flow or in the downstream direction parallel to the direction of exhaust gas flow. However, the flat segments may be positioned offset from one another along the z-axis. For example, the first inner edge 250 may be parallel and aligned, e.g. stacked, with the second inner edge 254 when viewed along the z-axis, as shown in FIG. 4, where the second inner edge 254 and the terminal edge 238 are indicated by dashed lines. The first flat segment 242 may be positioned to the left of the first inner edge 250 and the second flat segment 244 may be positioned to the right of the second inner edge 254. The first flat segment 242 and the second flat segment 244 do not overlap, as depicted in FIG. 4.

An angle Ω between the leading edge 222 and the first inner edge 250 may be 30 degrees, equal to an angle θ between the second inner edge 254 and the terminal edge 238, the angles indicated in FIG. 4. An angle between the leading edge 222 and the terminal edge 238 is therefore 60 degrees and a total angular sweep of the flow passage through the helical blade 212 is 420 degrees. Exhaust gases and entrained DEF droplets are therefore rotated more than one full circle around the central axis 203 of the exhaust passage 204, increasing a length of the flow passage significantly in comparison to a linearly configured mixer, e.g., a mixer with a flow passage parallel with the central axis 203. As such, the length of the flow passage through the helical blade 212 may be longer than an axial length of the helical blade 212, e.g., a length of the helical blade 212 along the central axis 203. Increasing the flow passage allows a mixing time between the DEF dose and the hot exhaust gases to be prolonged, augmenting evaporation of the droplets into the gases to form a homogenous mixture. By forming a uniform dispersion of the DEF fluid in the exhaust gases, conversion of urea to ammonia is more complete, maximizing an amount of ammonia adsorbed onto the SCR catalyst surfaces.

The arrangement of the first flat segment 242 and the second flat segment 244 at the upstream end 218 and downstream end 240 of the helical blade 212, respectively, provides the additional 60 degrees of rotation beyond one full rotation of the flow passage without adding to a total length of the helical blade 212 along the z-axis. An overall size of the helical blade 212 is maintained compact, reducing surface areas of the mixing assembly 202 which may cause DEF impingement. Thus, one or both of the first flat segment 242 and the second flat segment 244 may be expanded to increase rotation of the exhaust gases flowing through the helical blade 212. For example, increasing both angle Ω and angle θ to 90 degrees may increase gas rotation by an additional 180 degrees without increasing the axial length, e.g., along the central axis 203, of the helical blade 212. However, benefits provided by increasing surface areas of the flat segments may be offset by increasing friction between gas flow and surface areas of the helical blade 212 at the flat segments, increasing a likelihood of flow restriction and back pressure generated upstream of the mixing assembly 202. Thus configuring angle Ω and angle θ to each be 30 degrees may maintain uninhibited flow through the helical blade 212, circumventing accumulation of pressure upstream in the exhaust manifold which may be further controlled by adjusting a pitch of the helical blade 212, discussed further below.

Furthermore, providing the exhaust gas flow with a single flow passage rather than multiple flow passages may promote flow of larger DEF droplets, with a heavier mass and higher inertia than smaller droplets, to travel through a central region of the inner volume 206 of the exhaust passage 204. For example, a larger DEF droplet may swirl closer to the central axis 203 than a smaller droplet, decreasing a likelihood of contact between the larger DEF droplet and the inner surface of the exhaust passage 240. Thus, deposition of larger DEF droplets along the inner surface of the exhaust passage 204 is reduced. The single flow passage may also decrease a likelihood of uneven distribution through the exhaust passage 204 and formation of a non-homogeneous DEF/exhaust gas mixture reaching the SCR catalyst.

By configuring the first flat segment 242 and second flat segment 244 co-planar with the x-y plane in contrast to the central portion 246 of the helical blade 212 which spirals along the z-axis and is not co-planar with the x-y axis, a cross-sectional width of the flow passage through the helical blade 212 is reduced locally at the flat segments. For example, a first cross-sectional width 502 along the z-axis in FIG. 5 between a first point along the first flat segment 242 and a second point along a surface of the central portion 246 of the helical blade 212, the second point downstream of the first point and aligned along the z-axis, may be less than a second cross-sectional width 504 between a third point along an upstream wall of the central portion 246 and a fourth point along a downstream wall of the central portion 246, the third point and fourth point aligned along the z-axis. A similar narrowing of a cross-sectional width of the helical blade 212 may occur at the second flat segment 244. The reduced cross-sectional width of the flow passage at the upstream end 218 and downstream end 240 of the helical blade 212 may induce local acceleration of exhaust gas flow, further promoting entrainment and evaporation of DEF droplets into the exhaust gas stream at the upstream end 218 and encouraging transport of the DEF/exhaust gas mixture out of the helical blade 212 at the downstream end 420. The increased flow velocity into the helical blade 212 may also mitigate impingement of DEF droplets on surfaces leading to evaporation of water from the trapped droplets. An overall amount of deposit formation is thus reduced.

The angular sweep of the helical blade 212 may be tuned in combination with a pitch 302 of the helical blade, the pitch 302 depicted in FIGS. 3, 5, and 6. The pitch 302 may be a length the helical blade 212 extending along the z-axis through one full rotation (e.g., 360 degrees). In other words, the pitch 302 is a distance along the central axis 203 between the first inner edge 250 and the second inner edge 254. By varying the pitch 304, accumulation of backpressure upstream of the mixing assembly 202, resulting from flow restriction, may be circumvented. The pitch 302 may be adjusted based on a desired length of the helical blade 212 depending on a geometry of the exhaust passage 204. For example, if the helical blade 212 is to be implemented in a tight space within a relatively short section of the exhaust passage 204, the pitch 302 may be reduced and the angles Ω and θ (shown in FIG. 4) of the first and second flat segments 242, 244 may be increased greater than 30 degrees each to compensate for a shortened flow passage length through the central portion 246 of the helical blade 212 when the pitch 302 is decreased. Furthermore, the pitch 302 may be adjusted based on an anticipated flow velocity through exhaust passage 204 and increased or decreased to maintain the velocity through the helical blade 212. The angles Ω and θ may thus vary between 20-60 degrees while the pitch 302 may be adjusted between 0-30% of the pitch 302 when the angles Ω and θ are each 30 degrees.

In addition, the orientation of the injector 208 may be varied to accommodate adjustments to the helical blade 212. For example, the injector 208 may be tilted more or less than 24 degrees depending on a positioning of the leading edge 222, e.g., if angle Ω deviates from 30 degrees, but maintained above the leading edge 222 and spaced away from the leading edge by the radius 252 of the exhaust passage 204. Furthermore, in some examples, the first flat segment 242 may not have the same dimensions as the second flat segment 244 and instead be formed from a larger or smaller panel (e.g., have a larger or smaller surface area) than the second flat segment 244.

In this way, FIGS. 2-6 show a mixing assembly arranged in an exhaust pipe shaping an exhaust passage. The mixing assembly may be physically coupled to interior surfaces of the exhaust pipe. In one example, an outer edge of a helical blade of the mixer is in face-sharing contact with interior surfaces of the exhaust pipe along an entire length of the outer edge. The face-sharing contact may comprise a hermetic seal such that exhaust gases and the like may not flow between the outer edge and the exhaust pipe.

The helical blade may be physically coupled to a central hub. A radius of the helical blade may be equal to a distance between an outer portion of the central hub and the outer edge. The central hub may be fixed such that the helical blade is immovable. As such, the helical blade may not be coupled to an electronic, a mechanical, a pneumatic, a hydraulic, or other similar actuator. However, in other examples, the helical blade may be configured to be mobile. For example, the central hub may be fixed to a surface of the exhaust pipe and the helical blade adapted to spin around the central hub.

The helical blade may be a solid, continuous piece free of openings. As such, exhaust gas and other liquids and/or gases may not flow through a surface of the helical blade. In this way, the helical blade is shaped to force an exhaust gas mixture to flow along a contour of the helical blade as it flows in a downstream direction. By doing this, the exhaust gas mixture is diverted from flowing in a direction parallel to a central axis of the exhaust pipe to a circular direction around the central axis of the exhaust pipe. The exhaust gas mixture may not flow out of the exhaust pipe while flowing along surfaces of the helical blade.

An injector is positioned to inject at a portion of the exhaust passage upstream of the helical blade. The injector may inject in a direction angled to each of an incoming direction of exhaust gas relative to the mixer and a circular direction of exhaust gas flowing around the helical blade of the mixer. The injection may collide with the exhaust gas, wherein the resulting exhaust gas mixture flows around the helical blade at least 180° about the central axis in a downstream direction. In one example, exhaust gas contacts at least a portion of the helical blade before reaching a portion of the exhaust passage downstream of the helical blade.

Upon reaching an extreme downstream end of the helical blade, the exhaust gas mixture may turn and begin flowing in the downstream direction parallel to the central axis and perpendicular to the circular direction. As such, the exhaust gas may return to flow in a direction similar to its flow upstream of the mixer, which may be a substantially laminar flow. However, a homogeneity of the exhaust gas may be increased relative to its homogeneity upstream of the mixer. Furthermore, distribution of the injection may be enhanced via the mixer such that radially outer portion of the exhaust passage may comprise an equal amount of the injection relative to radially inner portion of the exhaust passage.

In this way, a mixing assembly for an exhaust passage may effectively increase mixing and evaporation of a DEF fluid in an exhaust gas stream, upstream of an SCR catalyst. The mixing assembly may include an injector and a helical blade, the injector positioned on an opposite side of the exhaust passage, relative to a central axis of the exhaust passage, from a leading edge of the helical blade and aligned with the leading edge along a plane perpendicular to gas flow. The injector may be tilted at an angle to spray DEF fluid into the exhaust gas stream in an opposing direction relative to a rotation of the gas stream as the gases flow through the helical blade. As the gases pass through the helical blade, the gas stream is rotated greater than 360 degrees, prolonging a flow passage through helical blade that allows a mixing and evaporation time for the DEF fluid to be increased while maintaining a compact size of the helical blade. The helical blade may include flat segments at an inlet and an outlet of the helical blade, providing rotation of the gas stream beyond 360 degrees and local acceleration of gas flow without increasing an axial length of the helical blade. The injector orientation, angular sweep, and pitch of the helical blade may be adjusted with respect to one another to enhance formation of small DEF droplets that are completely mixed and evaporated into the exhaust gas stream and delivered to the SCR catalyst as a homogeneous mixture. By providing a single, longer flow passage without increasing a surface area of the mixing assembly in the path of gas flow, a likelihood of DEF impingement on surfaces of the mixing assembly is decreased, enabling more complete delivery of a DEF dosage to the SCR catalyst. As a result, exhaust gas aftertreatment is more efficient without adversely affecting fuel consumption during low EGR operation where treatment of emissions relies solely on the emission control device.

A technical effect of implementing an exhaust passage of a vehicle with mixing assembly is that loss of DEF fluid due to impingement is reduced and more complete conversion of urea to ammonia is enabled, thereby effectively reducing $NO_x$ emissions.

In one embodiment, an exhaust mixing assembly includes a spiraling blade extending from an upstream fin to a downstream fin relative to a direction of incoming exhaust flow, wherein outer edges of the spiraling blade and the upstream and downstream fins are in face-sharing contact with an exhaust pipe shaping an exhaust passage, wherein an entire exhaust flow is forced to flow partially circularly along the spiraling blade before reaching a catalyst downstream of the exhaust mixer. In a first example of the mixing assembly, the mixing assembly further includes a leading edge at the upstream fin and a terminal edge at the downstream fin, the terminal edge extending along the radius of the exhaust passage from a central hub of the spiraling blade to an inner surface of the exhaust pipe and wherein the leading edge also extends along a radius of the exhaust passage, from the central hub of the spiraling blade to the inner surface of the exhaust pipe and the spiraling blade is free of openings. A second example of the mixing assembly optionally includes the first example, and further includes, an injecting device extending through a wall of the exhaust pipe, spaced away from the leading edge of the spiraling blade by the radius of the exhaust passage. A third example of the mixing assembly optionally includes one or more of the first and second examples, and further includes, wherein the spiraling blade has a central portion between the inlet and the outlet forming a helix with a first end proximate to the leading edge and a second end proximate to the terminal edge of the spiraling blade and wherein the central portion rotates through 360 degrees around the central axis from the first end to the second end and wherein the spiraling blade sweeps through an angle of 420 degrees from the leading edge to the terminal edge. A fourth example of the mixing assembly optionally includes one or more of the first through third examples, and further includes, wherein the leading edge is angled relative to the terminal edge by 60 degrees relative to the central axis. A fifth example of the mixing assembly optionally includes one or more of the first through fourth examples, and further includes, wherein the spiraling blade has a first flat segment extending from the leading edge to the first end of the central portion, forming a wedge-shaped panel and a second flat segment extending from the second end of the central portion to the terminal edge, also forming a wedge-shaped panel and wherein the first flat segment and second flat segment are each aligned perpendicular to a central axis of the exhaust passage and to a direction of incoming exhaust gas flow. A sixth example of the mixing assembly optionally includes one or more of the first through fifth examples, and further includes, wherein the first flat segment and the second flat segment are offset from one another along a length of the spiraling blade, the length parallel with the central axis of the exhaust passage. A seventh example of the mixing assembly optionally includes one or more of the first through sixth examples, and further includes, wherein a cross-sectional width of the helical gas flow passage at the first flat segment and at the second flat segment is narrower than a cross-sectional width of the gas flow passage along the central portion of the spiraling blade and wherein dimensions and a geometry of the first flat segment are equal to dimensions and a geometry of the second flat segment. An eighth example of the mixing assembly optionally includes one or more of the first through seventh examples, and further includes, wherein the injecting device is parallel with a plane perpendicular to the central axis and tilted at an angle within the plane relative to the leading edge of the spiraling blade. A ninth example of the mixing assembly optionally includes one or more of the first through eighth examples, and further includes, wherein the injecting device is coupled to one or more DEF reservoirs and includes an element that introduces the DEF from the reservoirs directly into the exhaust passage as droplets and wherein the droplets are sprayed into the exhaust passage at a cone angle of 30 degrees. A tenth example of the mixing assembly optionally includes one or more of the first through ninth examples, and further includes, wherein the injecting device is tilted 24 degrees relative to the leading edge of the spiraling blade. An eleventh example of the mixing assembly optionally includes one or more of the first through tenth examples, and further includes, wherein the DEF is sprayed into the exhaust passage by the injecting device in a direction opposite of a direction of spiral of the spiraling blade.

In another embodiment, a mixing assembly includes an injecting device configured to deliver a diesel exhaust fluid (DEF) to a flow of exhaust gas, and a spiraling blade positioned downstream of the injector and defining a helical gas flow passage, a leading edge of the spiraling blade arranged opposite of the injecting device relative to a central axis of the exhaust passage. In a first example of the mixing assembly, the spiraling blade spirals along a first direction from a first, upstream end to a second, downstream end, and wherein an outer edge of the spiraling blade is flush and in face-sharing contact with a wall of the exhaust passage, a coupling between the outer edge and the wall shaped to prevent exhaust gas from flowing through the coupling. A second example of the mixing assembly optionally includes the first example, and further includes, wherein the injecting device is configured to spray the DEF as a liquid or vapor injection directly into the exhaust passage along a second direction, the second direction opposite of the first direction. A third example of the mixing assembly optionally includes one or more of the first and second examples, and further includes, wherein the helical gas flow passage length through the spiraling blade is longer than a length of the spiraling blade measured along a central axis of the exhaust passage, and wherein all of the stream of exhaust gas is forced to contact at least a portion of the spiraling blade and flow at least partially circularly around the central axis before exiting the spiraling blade and reaching an emission aftertreatment device.

In another embodiment, an exhaust system includes an exhaust passage coupling an exhaust manifold to an emission control device, and a mixing assembly positioned in the exhaust passage upstream of the emission control device, the mixing assembly including an injector configured to spray a diesel exhaust fluid in an opposite direction of exhaust gas flow and a helical blade with a leading edge spaced away from the injector by a radius of the exhaust passage, configured to rotate exhaust gas flow greater than 360 degrees. In a first example of the exhaust system, the emission control device includes a selective catalytic reduction catalyst. A second example of the exhaust system optionally includes the first example, and further includes, wherein the diesel exhaust fluid is an aqueous solution of urea. A third example of the exhaust system optionally includes one or more of the first and second examples, and further includes, wherein the mixing assembly is spaced away from the emission control device by at least an axial length of the mixing assembly, the axial length parallel with a central axis of the exhaust passage.

In another representation, a diesel-powered vehicle comprising an exhaust passage extending between an exhaust manifold and an exhaust aftertreatment device delivering exhaust gas from the exhaust manifold to the aftertreatment device, a helical mixing device arranged in the exhaust passage between the exhaust manifold and the aftertreatment device, the mixing device configured to receive exhaust gases from the exhaust manifold and swirl the exhaust gases upstream of the aftertreatment device, and an injector coupled to a port in a wall of the exhaust passage, aligned with an inlet of the helical mixing device and opposite of the inlet along a circumference of the exhaust passage wall and configured to spray a fluid into the exhaust gases in a direction opposite of a direction of exhaust gas flow through the helical mixing device.

In yet another representation, an exhaust passage of an engine includes an injecting device coupled to at least one fluid reservoir and extending through a wall of the exhaust passage, and a helical mixing device arranged downstream of the injecting device and circumferentially surrounded by the wall of the exhaust passage, configured to rotate a stream of exhaust gas upstream of an emission aftertreatment device.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust mixing assembly comprising:
a spiraling blade extending from an upstream fin to a downstream fin relative to a direction of incoming exhaust flow, wherein outer edges of the spiraling blade and the upstream and downstream fins are in face-sharing contact with an exhaust pipe shaping an exhaust passage, wherein an entire exhaust flow is forced to flow circularly along the spiraling blade before reaching a catalyst downstream of the exhaust mixing assembly; further comprising a leading edge at the upstream fin and a terminal edge at the downstream fin, the terminal edge extending along the radius of the exhaust passage from a central hub of the spiraling blade to an inner surface of the exhaust pipe and wherein the leading edge also extends along a radius of the exhaust passage, from the central hub of the spiraling blade to the inner surface of the exhaust pipe and the spiraling blade is free of openings, and wherein the spiraling blade has a central portion between an inlet and an outlet forming a helix with a first end proximate to the leading edge and a second end proximate to the terminal edge of the spiraling blade and wherein the central portion rotates through 360 degrees around a central axis from the first end to the second end and wherein the spiraling blade sweeps through an angle of 420 degrees from the leading edge to the terminal edge.

2. The exhaust mixing assembly of claim 1, further comprising an injecting device extending through a wall of the exhaust pipe, spaced away from the leading edge of the spiraling blade by the radius of the exhaust passage.

3. The exhaust mixing assembly of claim 1, wherein the leading edge is angled relative to the terminal edge by 60 degrees relative to the central axis.

4. The exhaust mixing assembly of claim 3, wherein the spiraling blade has a first flat segment extending from the leading edge to the first end of the central portion, forming a wedge-shaped panel and a second flat segment extending from the second end of the central portion to the terminal edge, also forming a wedge-shaped panel and wherein the first flat segment and the second flat segment are each aligned perpendicular to a central axis of the exhaust passage and to the direction of incoming exhaust gas flow.

5. The exhaust mixing assembly of claim 4, wherein the first flat segment and the second flat segment are offset from one another along a length of the spiraling blade, the length parallel with the central axis of the exhaust passage.

6. The exhaust mixing assembly of claim 5, wherein a cross-sectional width of a helical gas flow passage at the first flat segment and at the second flat segment is narrower than a cross-sectional width of the helical gas flow passage along the central portion of the spiraling blade and wherein dimensions and a geometry of the first flat segment are equal to dimensions and a geometry of the second flat segment.

7. The exhaust mixing assembly of claim 2, wherein the injecting device is parallel with a plane perpendicular to the central axis and tilted at an angle within the plane relative to the leading edge of the spiraling blade.

8. The exhaust mixing assembly of claim 7, wherein the injecting device is coupled to one or more DEF reservoirs and includes an element that introduces the DEF from the reservoirs directly into the exhaust passage as droplets and wherein the droplets are sprayed into the exhaust passage at a cone angle of 30 degrees.

9. The exhaust mixing assembly of claim 8, wherein the injecting device is tilted 24 degrees relative to the leading edge of the spiraling blade.

10. The exhaust mixing assembly of claim 9, wherein the DEF is sprayed into the exhaust passage by the injecting device in a direction opposite of a direction of spiral of the spiraling blade.

11. A mixing assembly for an exhaust passage of a vehicle, comprising;
an injecting device configured to deliver a diesel exhaust fluid (DEF) to a flow of exhaust gas; and
a spiraling blade positioned downstream of the injecting device and defining a helical gas flow passage, a leading edge of the spiraling blade arranged opposite of the injecting device relative to a central axis of the exhaust passage, and wherein the spiraling blade is a single, continuous piece and free of openings, and wherein the spiraling blade is the only spiraling blade of the mixing assembly.

12. The mixing assembly of claim 11, wherein the spiraling blade spirals along a first direction from a first, upstream end to a second, downstream end, and wherein an outer edge of the spiraling blade is flush and in face-sharing contact with a wall of the exhaust passage, a coupling between the outer edge and the wall shaped to prevent exhaust gas from flowing through the coupling.

13. The mixing assembly of claim 12, wherein the injecting device is configured to spray the DEF as a liquid or vapor injection directly into the exhaust passage along a second direction, the second direction opposite of the first direction.

14. The mixing assembly of claim 13, wherein the helical gas flow passage length through the spiraling blade is longer than a length of the spiraling blade measured along a central axis of the exhaust passage, and wherein all of the stream of exhaust gas is forced to contact at least a portion of the spiraling blade and flow at least partially circularly around the central axis before exiting the spiraling blade and reaching an emission aftertreatment device.

15. An exhaust system of a vehicle comprising;
an exhaust passage coupling an exhaust manifold to an emission control device; and
a mixing assembly positioned in the exhaust passage upstream of the emission control device, the mixing assembly including an injector configured to spray a diesel exhaust fluid in an opposite direction of exhaust gas flow and a helical blade with a leading edge spaced away from and downstream of the injector by a radius of the exhaust passage, configured to rotate exhaust gas flow greater than 360 degrees, and wherein the helical blade is a single, continuous piece and free of openings and wherein the helical blade is the only spiraling blade of the mixing assembly.

16. The exhaust system of claim 15, wherein the emission control device includes a selective catalytic reduction catalyst.

17. The exhaust system of claim 15, wherein the diesel exhaust fluid is an aqueous solution of urea.

18. The exhaust system of claim 15, wherein the mixing assembly is spaced away from the emission control device by at least an axial length of the mixing assembly, the axial length parallel with a central axis of the exhaust passage.

* * * * *